May 25, 1943.  B. M. HYMAN  2,320,135
CORN PICKER
Filed Aug. 20, 1941   2 Sheets-Sheet 1
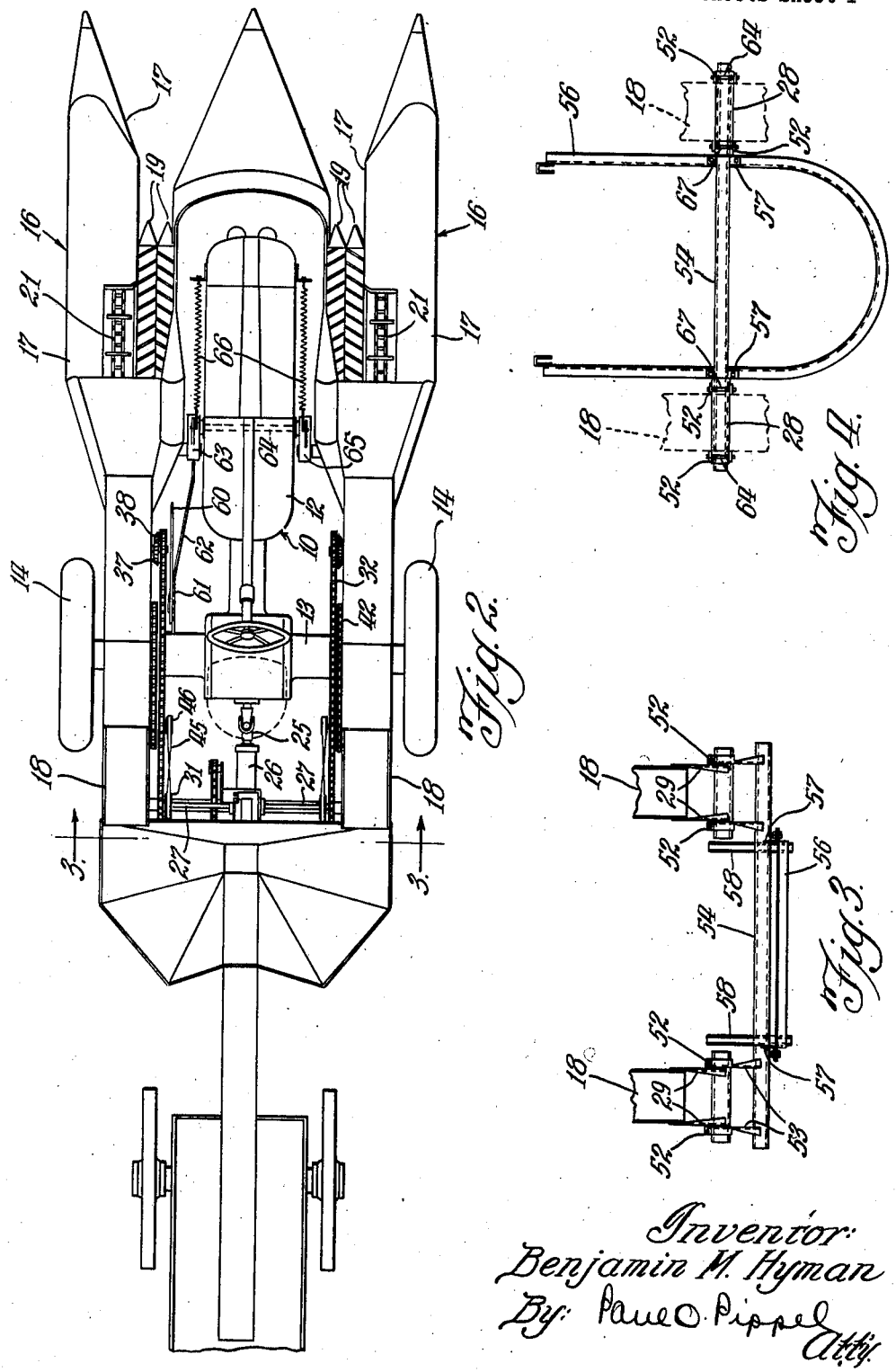
Inventor:
Benjamin M. Hyman
By Paul O. Pippel
Atty.

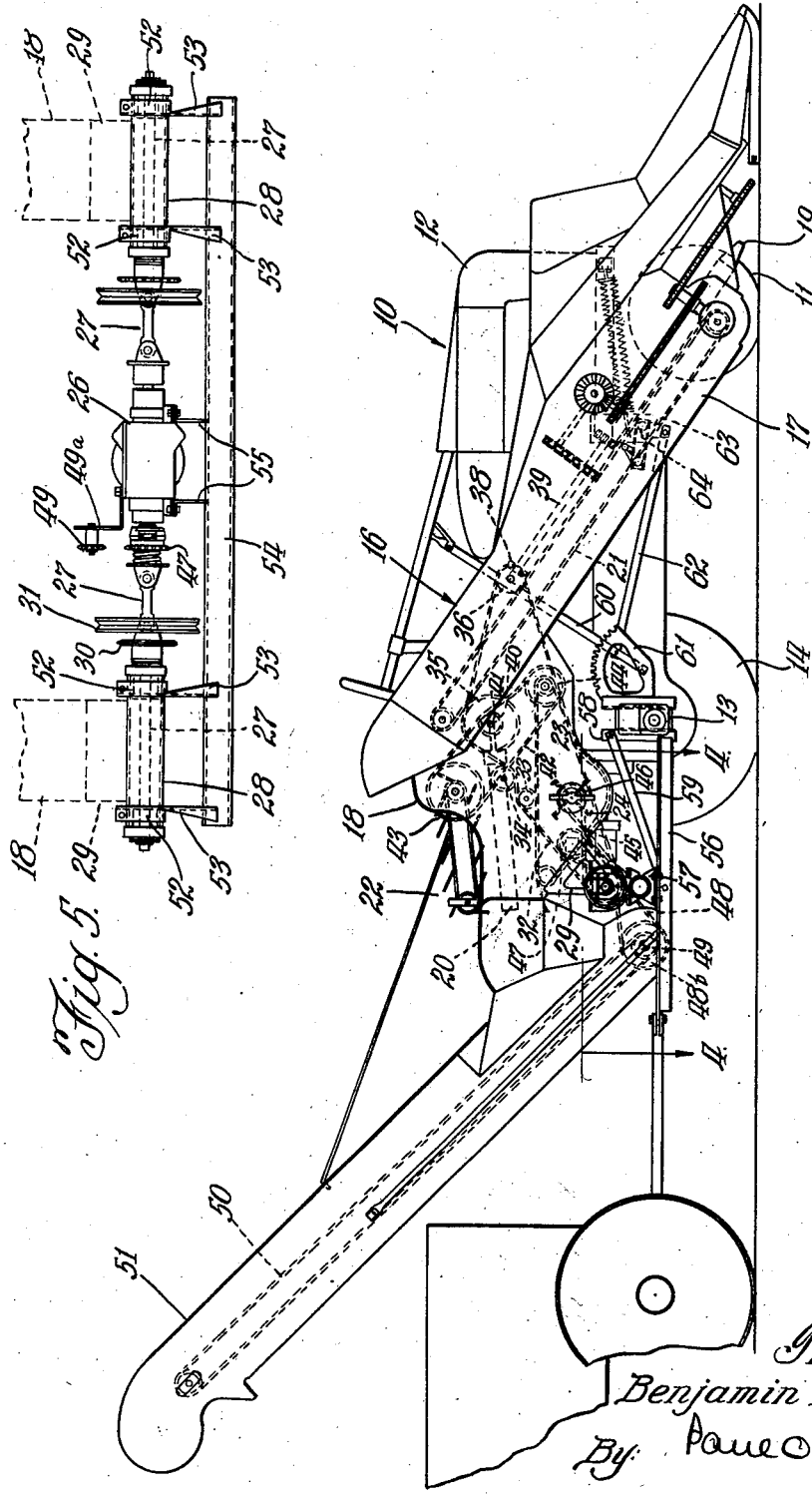

Patented May 25, 1943

2,320,135

UNITED STATES PATENT OFFICE 2,320,135

CORN PICKER

Benjamin M. Hyman, Moline, Ill., assignor to International Harvester Company, a corporation of New Jersey Application August 20, 1941, Serial No. 407,538

4 Claims. (Cl. 56—18)

This invention relates to a mounting for a harvester. More specifically, it relates to the mounting of a corn picker upon a tractor.

The mounting of a harvester, such as a corn picker, upon a tractor presents many problems. The harvester is normally heavy and hard to handle, and the attachment and detachment of the harvester to and from the tractor may be difficult.

An object of the present invention is to provide an improved mounting for a harvester.

A further object is the provision of an improved mounting for a corn picker upon a tractor.

According to the present invention, a corn picker, comprising two units positioned at opposite sides of the tractor, is pivotally mounted on a structure secured at the rear of the tractor. Pivoting of the corn picker for adjustment with respect to the tractor is effected about a horizontal axis to the rear of the tractor axle and at the very rear of the corn picker.

In the drawings,

Figure 1 is a side view of a tractor and a corn picker mounted thereon in the novel manner of the present invention;

Figure 2 is a plan view of the tractor and corn picker of Figure 1;

Figure 3 is a rear view, showing the rear end of the corn picker and the structure upon which the corn picker is mounted;

Figure 4 is a plan view, showing the parts of Figure 3; and,

Figure 5 is a rear view somewhat similar to Figure 3, but showing parts through which drive is transmitted to the corn picker.

The reference character 10 denotes a tractor which is composed of a narrow front rolling support 11, a narrow body 12, an extended rear axle 13, and rear wheels 14. Mounted upon the tractor is a corn harvester comprising two corn harvester devices 16 positioned at opposite sides of the tractor 10. Each corn harvester device 16 is composed of a snapping unit 17 and a husking unit 18 rigidly attached to one another. Each snapping unit 17 has a pair of snapping rolls 19, and each husking unit 18 has husking rolls 20. In each corn-harvester device 16 an ear elevator 21 extends from alongside the snapping rolls 19 to the husking rolls 20. Each husking unit 18 has an ear forwarder 22 over the husking rolls 20, a husk conveyor 23 beneath the husking rolls 20, and a fan 24 within the husk conveyor 23.

Drive of the corn-husker units 16 originates with a power take-off shaft 25 extending from the rear of the tractor. The shaft 25 extends into a gear-box 26, from which extend transverse shaft means 27. The outer ends of the shaft means 27 are supported in tubular sections 28 rigidly secured to brackets 29 extending downwardly from the under side of the husking units 18. On each shaft means 27 there are secured a sprocket 30 and pulley 31. A sprocket chain 32 meshes with the sprocket 30 and also with two idler sprockets 33 and 34, sprocket 35 driving husking rolls 20, and sprocket 36 driving snapping rolls 19 through bevel gears 37 and 38 and shaft 39. The sprocket 35 driving the husking rolls 20 is secured to a shaft 40, to which is also secured a sprocket 41. A sprocket chain 42 meshes with the sprocket 41 and also with a sprocket 43 driving the ear forwarder belt 22 and with a sprocket 44 driving the husk conveyor 23. A crossed belt 45 engages pulley 31 and also a pulley 46 driving the fan 23.

A sprocket 47 is mounted upon one of the shaft means 27 and engages the outside of a sprocket-chain loop 48, in one end of which is located an idler sprocket 49 supported upon the gear-box 26 by means of a bracket 49a. Within the other end of the chain loop 48 is a sprocket 48b driving a conveyor 50 of a wagon elevator 51.

As previously stated, there are tubular sections 28 secured to brackets 29 depending from the rear end of the husking units 18. The tubular sections 28 rest in bearing portions 52 of pairs of spaced uprights 53 rigidly secured to a transverse pipe 54. The pipe 54 supports the gear-box 26 on brackets 55. The pipe 54 is secured to a U-shaped draw-bar 56 by brackets 57. The draw-bar 56 is secured at the rear of the tractor axle 13 by channels 58 and brace members 59. The wagon elevator 51 is also supported on the draw-bar 56.

Pivoting of the corn picker 15 with respect to the tractor 10 takes place by angular movement of tubular sections 28 in bearing portions 52 in the uprights 53. Thus, the pivot axis of the picker is at the rear end of the husker and to the rear of the tractor rear axle. Adjustment of the picker is effected by a detent lever 60 at one side of the tractor body 12 securable to an arcute toothed plate 61. A link 62 connects the lever 60 with one arm of a bell-crank 63 secured to a rock-shaft 64 extending transversely beneath the tractor body 12. The other arm of the bell-crank 63 is connected to the corn picker unit 16 on the same side of the tractor body as the lever 60. A lever 65 is secured to the rock-shaft 64 at the other side of the tractor body and is connected with the corn picker unit at that side of the body. Counterbalancing springs 66 connect the bell-crank 63 and the lever 65 with the front of the tractor body 12.

Thus, it will be seen that there has been provided a corn harvester pivotally mounted on a tractor on an axis at the rear of the harvester and to the rear of the tractor rear axle.

Operation of the corn picker is in the usual manner and is, therefore, not described. Drive of the picker originates with the tractor power take-off shaft and is transmitted through the shaft means 27 mounted in the tubular sections 28, about which pivoting of the picker is effected.

As has been stated, the tubular sections 28 rest in bearing portions 52 of the uprights 53. These bearing portions are open at the top to permit removal of the picker from the tractor. Removable pins 67 hold the tubular sections 28 within the bearing portions 52.

It will be apparent from the foregoing description that a new and novel means for mounting a harvester upon a tractor has been provided.

The intention is to limit the invention only within the scope of the appended claims.

What is claimed is:

1. In combination, a tractor having a power take-off and a rear axle, supporting structure secured to the rear of the rear axle, a harvester extending alongside the tractor and over the rear axle and having a transversely extending tubular section at the rear by means of which the harvester is pivotally mounted on the supporting structure, and means connecting the power take-off and the harvester for driving the same and comprising a longitudinally extending shaft connected with the power take-off, a gear-box connected with the longitudinally extending shaft, and transversely extending shaft means connected with the gear-box and rotatably supported in the said tubular section.

2. In combination, a tractor having a power take-off and a rear axle, supporting structure secured to the rear of the rear axle, a harvester extending alongside the tractor and over the rear axle and having a transversely extending tubular section at the rear by means of which the harvester is pivotally mounted on the supporting structure, and means connecting the power take-off and the harvester for driving the same and comprising transversely extending shaft means rotatably supported in the said tubular section.

3. In combination, a tractor having a rear axle, a narrow body, and a narrow front rolling support, a supporting structure secured to the tractor to the rear of the rear axle, a corn picker extending along the narrow body from alongside the front rolling support over the rear axle to the supporting structure, and means pivotally mounting the rear end of the corn picker on the supporting structure at a point spaced from and to the rear of the rear axle.

4. In combination, a tractor having a rear axle, a supporting structure secured to the tractor to the rear of the rear axle, a corn picker extending from the front of the tractor entirely over the rear axle to the supporting structure, and means pivotally mounting the rear end of the corn picker on the supporting structure at a point spaced from and to the rear of the rear axle.

BENJAMIN M. HYMAN.